US008840145B2

(12) United States Patent
Bougher et al.

(10) Patent No.: US 8,840,145 B2
(45) Date of Patent: Sep. 23, 2014

(54) SEAT BELT SYSTEM WITH ROLLOVER LOCKING TONGUE (71) Applicant: TK Holdings Inc., Auburn Hills, MI (US)

(72) Inventors: Jonathon Michael Bougher, Lake Orion, MI (US); Darren Wade Goudeau, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/922,118

(22) Filed: Jun. 19, 2013

(65) Prior Publication Data

US 2013/0341994 A1 Dec. 26, 2013

Related U.S. Application Data (60) Provisional application No. 61/662,897, filed on Jun. 21, 2012.

(51) Int. Cl.
*B60R 22/00* (2006.01)
*A44B 11/08* (2006.01)
*A44B 11/25* (2006.01)
*B60R 22/12* (2006.01)
*B60R 22/18* (2006.01)

(52) U.S. Cl.
CPC .......... *A44B 11/2561* (2013.01); *A44B 11/2569* (2013.01); *B60R 22/12* (2013.01); *B60R 2022/1812* (2013.01); *B60R 22/18* (2013.01)
USPC ............................ 280/801.1; 24/171; 297/468

(58) Field of Classification Search
CPC ...................... B60R 22/185; B60R 2202/1812; A44B 11/06; A44B 11/08; A44B 11/10; A44B 11/12; A44B 11/16

USPC ................ 24/168, 170, 171, 178, 181, 593.1; 180/271, 281; 280/801.1, 806; 297/468, 480

See application file for complete search history.

(56) References Cited

U.S. PATENT DOCUMENTS 3,157,929 A * 11/1964 Warner et al. .................... 24/196
3,898,715 A * 8/1975 Balder ............................. 24/196

(Continued)

FOREIGN PATENT DOCUMENTS

KR 20-1999-0024390 U 7/1999

OTHER PUBLICATIONS

International Search Report mailed Jan. 8, 2014 issued in connection with International Application No. PCT/US2013/046725.

(Continued)

*Primary Examiner* — Faye M Fleming
*Assistant Examiner* — Laura Freedman
(74) *Attorney, Agent, or Firm* — Foley & Lardner LLP (57) ABSTRACT A tongue member comprising a structural member including a latch plate configured to detachably engage the buckle mechanism and a side wall including an opening; a lock bar configured to move along the opening between a first position and a second position relative to the structural member; and a lock member configured to secure the lock bar in the second position; wherein when the lock bar is in the first position, the tongue member is allowed to move freely along the seat belt, and wherein when the lock bar is in the second position, a clamping surface of the lock bar secures a section of the seat belt to a clamping surface of the structural member to fix the relative position of the tongue member along the seat belt.

18 Claims, 4 Drawing Sheets

(56) References Cited

U.S. PATENT DOCUMENTS

| | | | |
|---|---|---|---|
| 3,913,977 A * | 10/1975 | Takada | 297/476 |
| 4,291,918 A * | 9/1981 | Finn et al. | 297/483 |
| 4,386,452 A | 6/1983 | Stephenson | |
| 4,551,889 A * | 11/1985 | Narayan et al. | 24/196 |
| 4,588,207 A | 5/1986 | Doty | |
| 4,726,625 A | 2/1988 | Bougher | |
| 4,871,190 A * | 10/1989 | Willey | 280/801.1 |
| 4,878,271 A * | 11/1989 | Kitokovsky | 24/194 |
| 4,893,874 A | 1/1990 | Childress et al. | |
| 4,903,377 A * | 2/1990 | Doty | 24/194 |
| 4,935,994 A * | 6/1990 | Boone et al. | 24/196 |
| 4,962,572 A * | 10/1990 | Prentkowski | 24/323 |
| 4,979,764 A * | 12/1990 | Drinane et al. | 280/808 |
| 5,023,980 A | 6/1991 | Thomas | |
| 5,050,274 A * | 9/1991 | Staniszewski et al. | 24/171 |
| 5,058,244 A | 10/1991 | Fernandez | |
| 5,100,176 A | 3/1992 | Ball et al. | |
| 5,138,749 A * | 8/1992 | McCune et al. | 24/196 |
| 5,295,713 A | 3/1994 | McCune et al. | |
| 5,309,606 A * | 5/1994 | Kawamura | 24/196 |
| 5,417,455 A * | 5/1995 | Drinane et al. | 280/808 |
| 5,806,148 A * | 9/1998 | McFalls et al. | 24/168 |
| 5,870,816 A * | 2/1999 | McFalls et al. | 29/434 |
| 6,708,380 B2 * | 3/2004 | Schneider et al. | 24/633 |
| 7,010,836 B2 * | 3/2006 | Acton et al. | 24/265 BC |
| 7,325,280 B2 * | 2/2008 | Ichida | 24/170 |
| 7,871,132 B2 | 1/2011 | Rogers | |
| 8,052,220 B2 * | 11/2011 | Dennis et al. | 297/480 |
| 8,079,616 B2 * | 12/2011 | Higuchi et al. | 280/806 |
| 8,322,000 B2 * | 12/2012 | Dziengowski et al. | 24/196 |
| 8,474,106 B2 * | 7/2013 | Richter et al. | 24/265 BC |
| 2011/0119874 A1 | 5/2011 | Dziengowski et al. | |
| 2012/0286501 A1 * | 11/2012 | Goudeau et al. | 280/801.1 |

OTHER PUBLICATIONS

Written Opinion mailed Jan. 8, 2014 issued in connection with International Application No. PCT/US2013/046725.

* cited by examiner

SEAT BELT SYSTEM WITH ROLLOVER LOCKING TONGUE

CROSS-REFERENCE TO RELATED PATENT APPLICATIONS

This application claims the benefit of and priority to U.S. Provisional Patent Application No. 61/662,897, which was filed on Jun. 21, 2012. The foregoing U.S. provisional application is incorporated by reference herein in its entirety.

BACKGROUND

The present application relates generally to the field of seat belt systems for restraining occupants of vehicles. More specifically, the present application relates to a seat belt system having a tongue member configured to selectively lock a section of the seat belt (e.g., the webbing) to the tongue member.

Vehicles, such as passenger vehicles, include seat belt systems to restrain vehicle occupants during dynamic events of the vehicle, such as frontal-impact and roll-over events. The seat belt systems restrain the occupant by preventing deflection or excursion of the occupant or a portion of the occupant in the vehicle during the dynamic event to reduce the likelihood of occupant injury, such as, that may result from the occupant contacting other interior features of the vehicle (e.g., dashboard, instrument panel, etc.). The industries that use vehicles, such as the automotive industry, continually are in need of improved ways of restraining vehicle occupants to further improve safety of the occupant.

SUMMARY

One embodiment relates to a tongue member for use in a seat belt system also including a buckle mechanism and a seat belt. The tongue member includes a structural member, a lock bar, and a lock member. The structural member includes a latch plate configured to detachably engage the buckle mechanism and a side wall including an opening. The lock bar is configured to move along the opening between a first position and a second position relative to the structural member. The lock member is configured to secure the lock bar in the second position. When the lock bar is in the first position, the tongue member is allowed to move freely along the seat belt, and when the lock bar is in the second position, a clamping surface of the lock bar secures a section of the seat belt to a clamping surface of the structural member to fix the relative position of the tongue member along the seat belt.

Another embodiment relates to a seat belt system for securing an occupant of a vehicle. The seat belt system includes a seat belt, a buckle mechanism, and a tongue member slideably coupled to the seat belt. The tongue member includes a structural member including a latch plate configured to detachably engage the buckle mechanism; a lock bar movably attached to the structural member and configured to move between a first position and a second position; and a lock member configured to secure the lock bar in the second position. When the lock bar is in the first position, the tongue member can slide freely along the seat belt, and when the lock bar is in the second position, a clamping surface of the lock bar secures a section of the seat belt to a clamping surface of the structural member to fix the relative position of the tongue member along the seat belt.

Yet another embodiment relates to a tongue member for use in a seat belt system of a vehicle, the seat belt system also including a buckle mechanism and a seat belt. The tongue member includes a structural member, a clutch member, and a lock bar. The structural member includes a latch plate configured to detachably engage the buckle mechanism. The clutch member includes a clamping surface and coupled to the structural member. The lock bar includes a clamping surface and is slideably coupled to the structural member such that the lock bar can slide between a first position and a second position relative to the clutch member. When the lock bar is in the first position, the tongue member is allowed to move freely along the seat belt. When the lock bar is in the second position, the clamping surfaces of the clutch member and lock bar engage opposing sides of a section of the seat belt to secure the section and fix a relative position of the tongue member along the seat belt. Each clamping surface may include a friction element, such as teeth.

DETAILED DESCRIPTION

With general references to the Figures, disclosed herein are seat belt systems or assemblies configured to restrain occupants of vehicles. The seat belt assembly may include a tongue member that is configured to be slideably coupled to a seat belt and to selectively connect to a buckle assembly of the seat belt system. The tongue member may include a lock bar, a structural member, and a lock member, where the lock bar is configured to move relative to the structural member. The lock bar may move from a non-locking position to a locking position in the event of a vehicle dynamic event to lock the seat belt to the tongue member to prohibit relative movement between the tongue member and seat belt. The seat belt assembly may also include a clutch member configured to secure the webbing with the lock bar when the lock bar is in the locking position.

Figure 1:
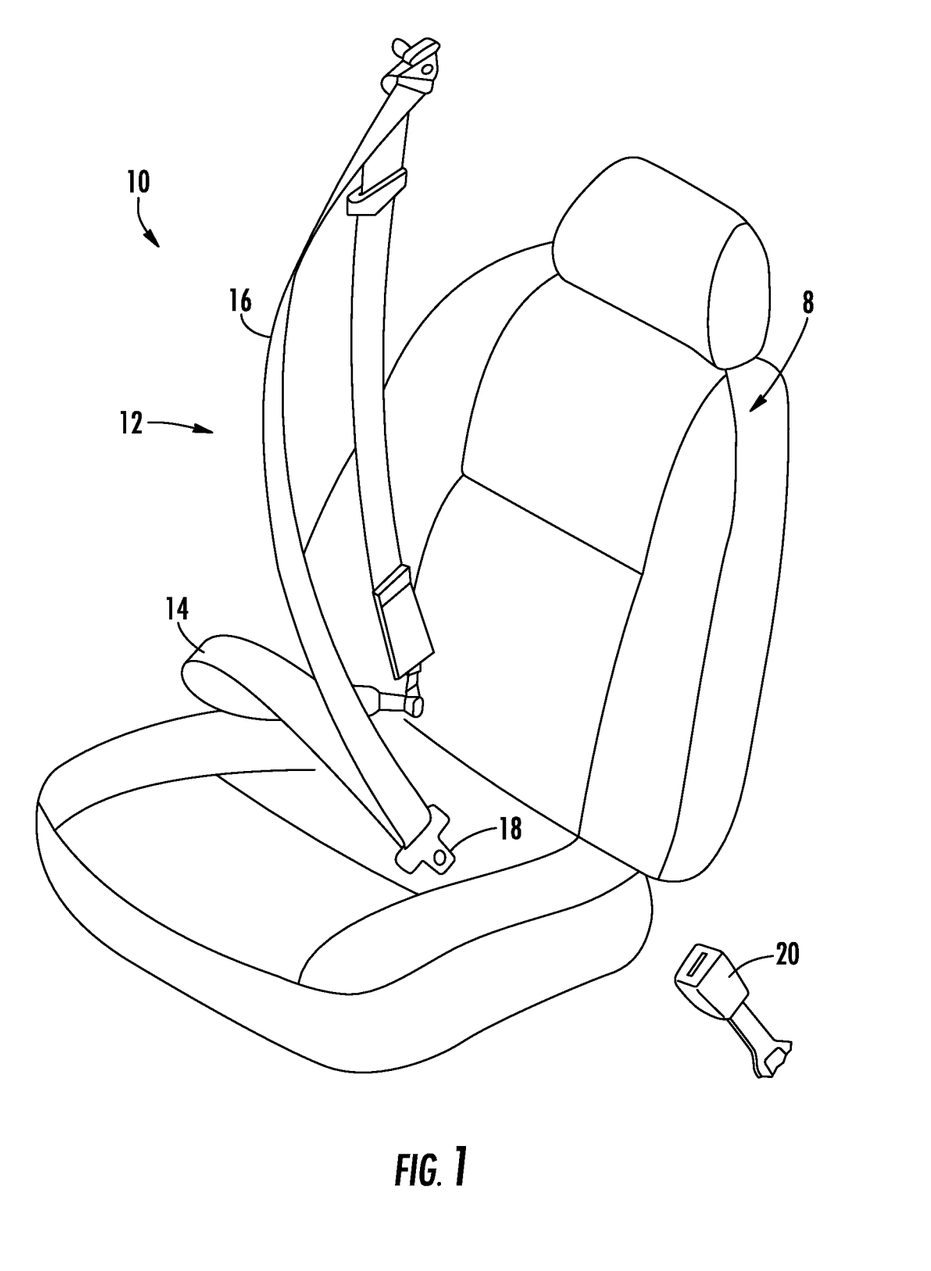
FIG. 1 is a perspective view of an exemplary embodiment of a seat belt system configured to restrain an occupant to a seat assembly.

FIG. 1 illustrates an exemplary embodiment of a seat belt assembly 10 configured to restrain an occupant (not shown) seated in the seat system 8. As shown, the seat belt assembly 10 includes a seat belt 12 (e.g., a webbing) having a lap portion 14 and a shoulder portion 16 that are separated by a tongue member 18 that is configured to selectively (e.g., releasably) engage a buckle mechanism 20. The lap portion 14 of the seat belt 12 is configured to generally wrap around the lap of the occupant to restrain the lower portion of the occupant during a dynamic vehicle event. The lap portion 14 may have an end disposed opposite the tongue member 18 and configured to be fixed, such as, for example, to the seat or to the vehicle by an anchor or mounting member. The shoulder portion 16 of the seat belt 12 is configured to generally wrap around the torso and shoulder of the occupant to restrain the torso or thorax of the occupant during a dynamic vehicle event. The shoulder portion 16 may have an end disposed opposite the tongue member 18 and configured to be secured, such as, for example, retractably secured to a refractor (not shown) where the retractor is configured to wind (e.g., retract) and unwind (e.g., extract) the seat belt 12 about a spool (not shown) of the retractor.

FIGS. 2-7 illustrate an exemplary embodiment of a tongue member 18 of the seat belt assembly 10. The tongue member 18 may be slideably coupled to the seat belt 12 to allow the tongue member 18 to be moved along a length of the seat belt 12, such as, during normal vehicle use (i.e., when the vehicle is not in a dynamic event) to allow the restrained occupant to adjust a lap length and a shoulder length of the seat belt 12 to adjust the comfort of the seat belt 12. The tongue member 18 is configured to selectively engage the buckle mechanism 20 to lock the tongue member 18 and buckle mechanism 20 until released.

The tongue member 18 may include a structural member 30 and a lock bar 40 configured to move relative to the structural member 30. The structural member 30 may be made out of any suitable material, such as steel, that is strong enough to withstand the loads induced by restraining an occupant during the vehicle dynamic event. The structural member 30 of the tongue member 18 may include a base 31, a latch plate 32, and a side wall 33. As shown, the structural member 30 includes a base 31, a latch plate 32, and two spaced apart and opposing side walls 33.

The latch plate 32 may extend from the base 31 and may be configured to selectively engage the buckle mechanism 20. In other words, the latch plate 32 of the tongue member 18 may be configured to detachably (e.g., removably) engage the buckle mechanism 20. The latch plate 32 may be a generally rectangular shaped plate having an opening 32a (e.g., hole, aperture, etc.) disposed therein, which is configured to receive an engaging member of the buckle mechanism 20 to detachably lock the tongue member 18 to the buckle mechanism 20.

Figure 6:
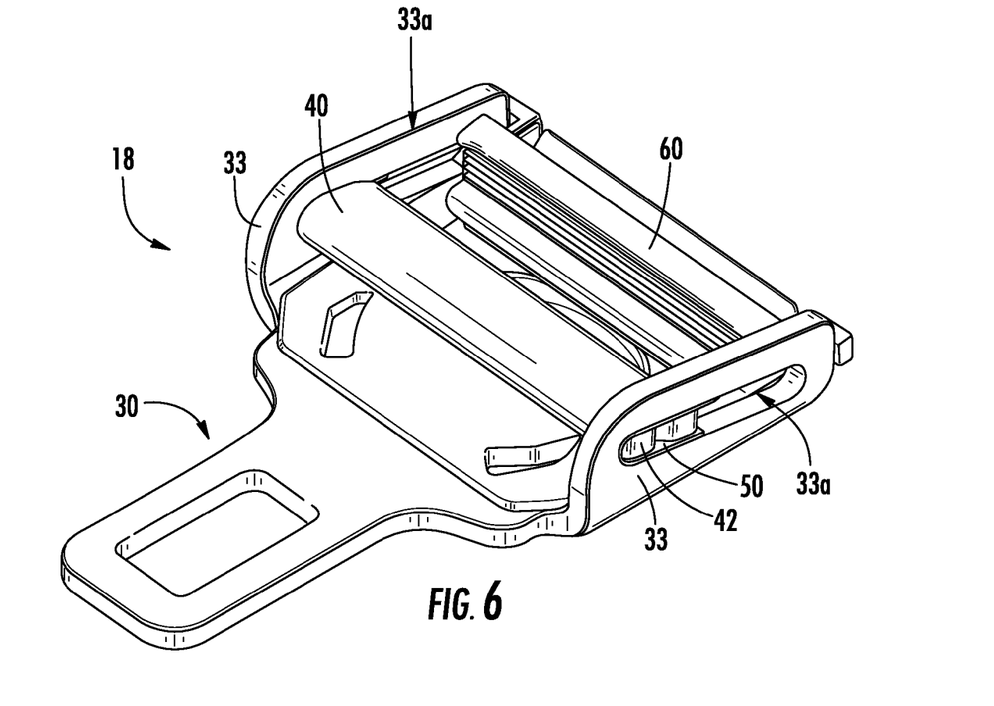
FIG. 6 is a perspective view of the tongue member of FIG. 2 shown without the cover and in the non-locking position.

The side wall 33 may extend from the base 31, such as, for example, in a direction that is generally perpendicular (e.g., transverse) to the base 31. As shown in FIG. 6, the tongue member 18 includes two spaced-apart and opposing walls 33 that extend generally parallel relative to each other from the base 31. Each wall 33 may include an opening 33a (e.g., hole, aperture, etc.) configured to slideably support the lock bar 40. The opening 33a may have any suitable configuration (e.g., shape, size, etc.), such as, for example, as an elongated slot. As discussed below, the length of the slotted opening 33a may be tailored to retain the lock bar 40 to the structural member 30 once the tongue member 18 is assembled.

Figure 2:
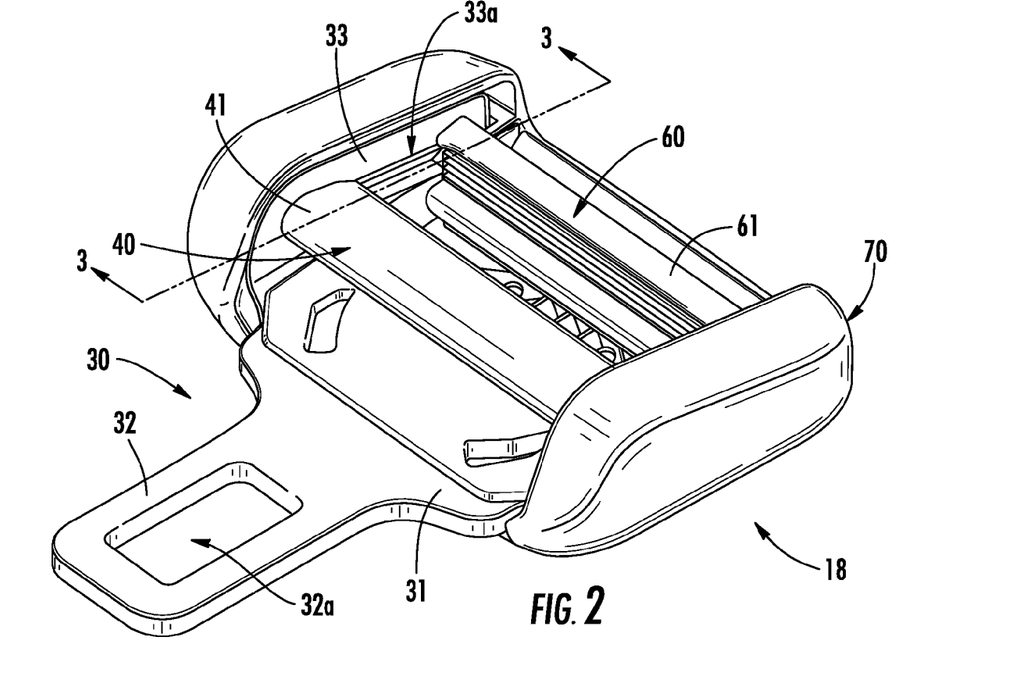
FIG. 2 is a perspective view of an exemplary embodiment of a tongue member for use in a seat belt system and configured in a non-locking position.
Figure 3:
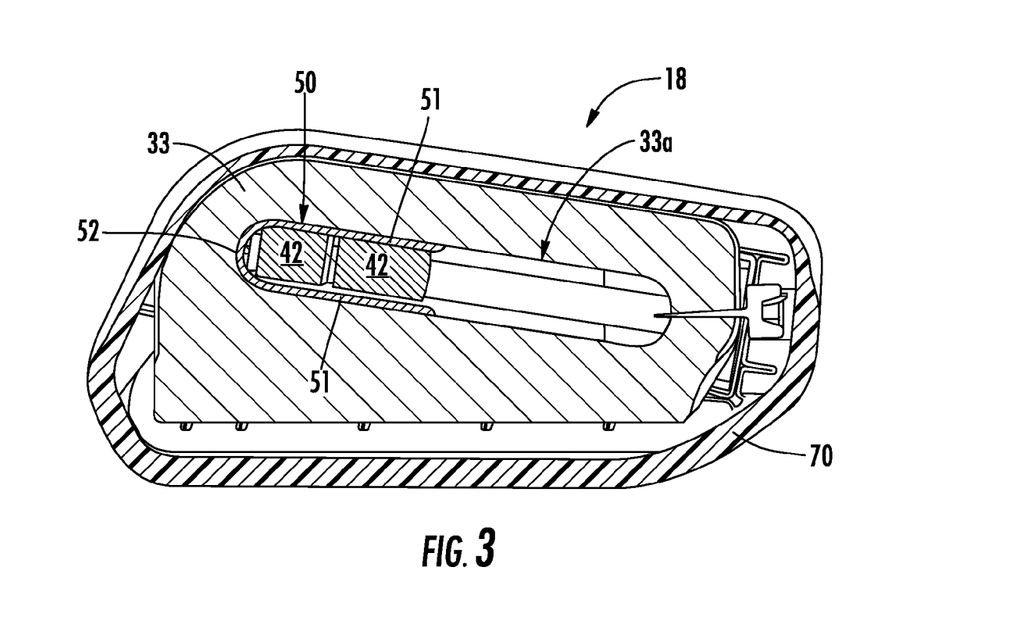
FIG. 3 is a side cross-sectional view of the tongue member of FIG. 2.
Figure 4:
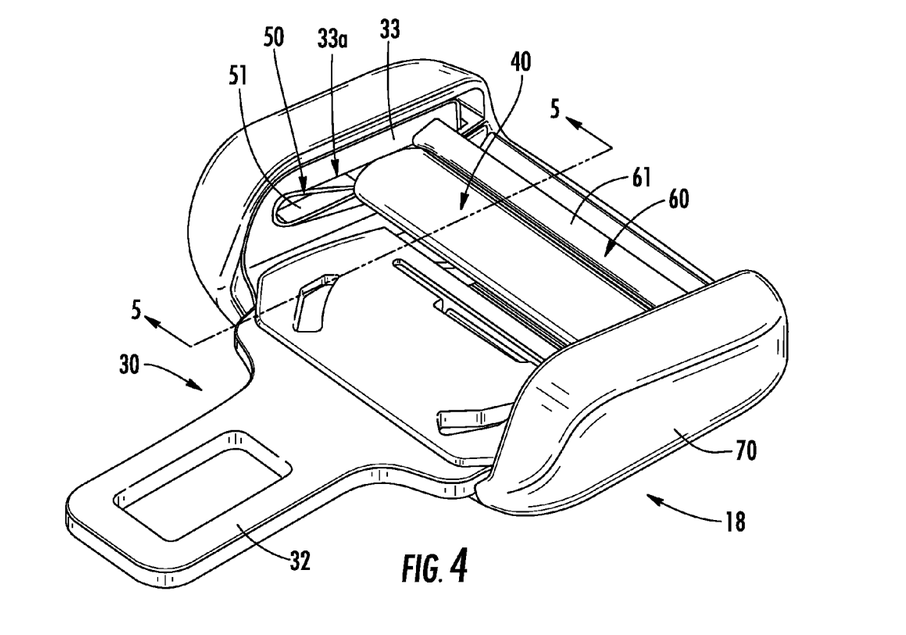
FIG. 4 is a perspective view of an exemplary embodiment of a tongue member for use in a seat belt system and configured in a locking position.
Figure 5:
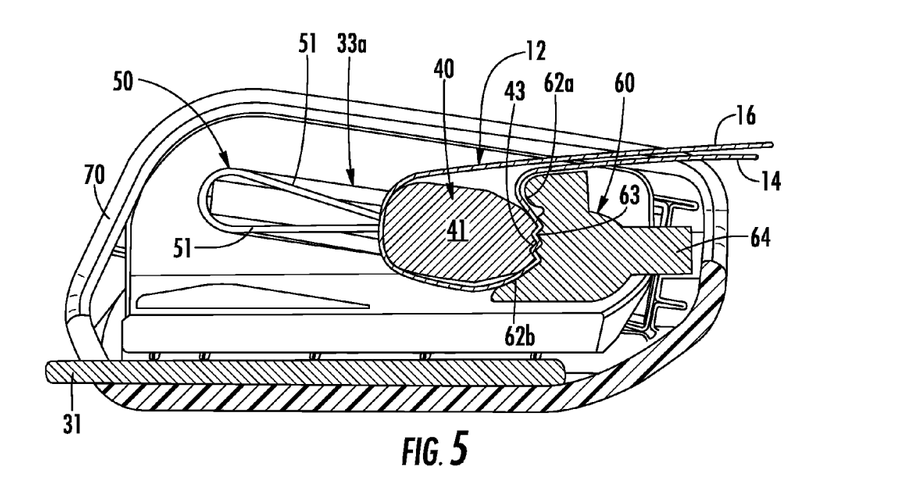
FIG. 5 is a side cross-sectional view of the tongue member of FIG. 4.
Figure 7:
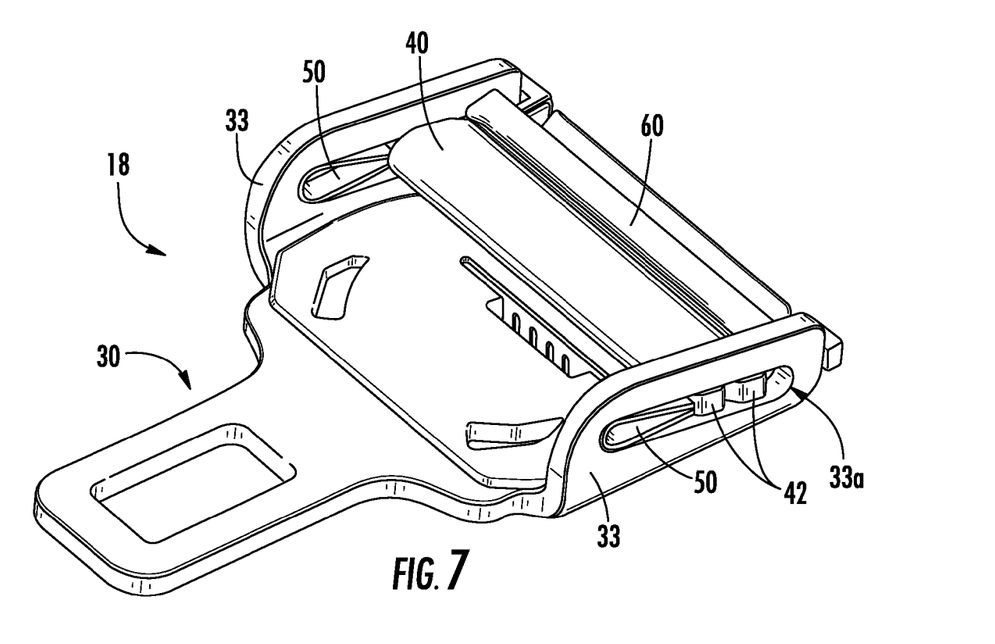
FIG. 7 is a perspective view of the tongue member of FIG. 4 shown without the cover and in the locking position.

The lock bar 40 is configured to move (e.g., slide) relative to the structural member 30, such as between a first position and a second position to change the operating mode of the tongue member 18. FIGS. 2, 3, and 6 illustrate the lock bar 40 in the first position, according to an exemplary embodiment. In the first position, the lock bar is configured to allow the seat belt 12 to move freely relative to the tongue member 18. In other words, in the first position, the tongue member 18 is able to slide along the seat belt 12. FIGS. 4, 5, and 7 illustrate the lock bar 40 in the second position, according to an exemplary embodiment. In the second position, the lock bar is configured to secure a portion of the seat belt 12, such as, for example, by clamping the portion of the seat belt 12 to another part of the tongue member 18. For example, when in the second position, a portion (e.g., a clamping surface) of the lock bar 40 engages a section of the seat belt 12, such as the section that transitions from lap portion 14 to shoulder portion 16, to secure the section of seat belt 12 between the portion of the lock bar 40 and a portion (e.g., a clamping surface) of the structural member 30 to fix the relative position of the tongue member 18 along the seat belt 12. In other words, in the second position, the lock bar 40 fixes the relative position of the tongue member 18 along the seat belt 12.

The lock bar 40 may be made out of any suitable material, such as steel, that is strong enough to withstand the loads induced by restraining an occupant during the vehicle dynamic event. The lock bar 40 may have any suitable configuration that is movably connected to the structural member 30 and configured to selectively engage the seat belt 12. As shown in FIGS. 2 and 3, the lock bar 40 includes an elongated body 41 and a shoulder 42 disposed on each end of the body 41 that is configured to engage a corresponding opening 33a in the respective wall 33 of the structural member 30. The body 41 may have any suitable length, such as, for example, a length that is slightly less than the spacing between the walls 33 of the structural member 30. Each shoulder 42 may have a cross-sectional shape that is configured to slideably engage the opening 33a of the wall 33. For example, each shoulder 42 may have a generally rectangular cross-sectional shape that is configured to slide within the opening 33a, such that the walls 33 defining the opening 33a support the shoulder 42 as the shoulder 42 moves in the opening 33a.

The lock bar 40 may also include a clamping surface 43 that is configured to engage the seat belt 12 when the lock bar 40 is in the second position. The clamping surface 43 may contact a section (e.g., a portion) of the seat belt 12 to clamp the section against another portion (e.g., a feature) of the tongue member 18 to secure (e.g., bind, hold) the seat belt 12 in place relative to the tongue member 18. The clamping surface 43 may include a friction element or another suitable element configured to help prohibit movement of the seat belt 12 relative to the tongue member 18 when secured. According to an exemplary embodiment, the clamping surface 43 includes a tooth configured to engage the seat belt 12. According to another exemplary embodiment, the clamping surface 43 includes teeth (e.g., more than one tooth) that engage a section of the seat belt 12 when the lock bar is in the second (e.g., locked) position, wherein the teeth are configured to mate with teeth on an opposing clamping surface (e.g., a clamping surface 63 of a clutch member 60) to secure the seat belt 12 between the lock bar 40 and the opposing member (e.g., the clutch member 60). Accordingly, the teeth of the lock bar 40 may complement the teeth of the structural member 30 and/or the clutch member 60. For example, the teeth (e.g., of the clamping surface 43, 63) may be formed by a combination of recesses and projections, which may complement the teeth of the other clamping surface, to pinch (e.g., secure) the seat belt 12.

The tongue member 18 may also include a lock member 50 that is configured to help maintain the lock bar 40 in the second position. As shown in FIG. 3, the lock member 50 is configured as a biasing member (e.g., a spring) including a pair of spaced apart legs 51 extending from a base 52. For example, the lock member 50 may be configured having a generally U-shape, such as when the lock bar 40 is in the first position. When the lock bar 40 is in the first position, the lock member 50 is configured in an open position with the legs 51 configured to straddle the shoulder 42 of the lock bar 40, which thereby maintains the separation of the legs 51 by the thickness of the shoulder 42. A portion of the lock member 50 may be disposed within the opening 33a in one of the walls 33 of the structural member 30. In other words, the lock member 50 may be disposed in the opening 33a of the wall 33 between the shoulder 42 of the lock bar 40 and the structural member 30 when the lock bar 40 is in its first position. The legs 51 may extend from the base 52, and the lock bar 40 may contact the base 52 or may be separated from the base 52 by a gap, such as when the lock bar 40 is in the first position. According to an exemplary embodiment, the lock member 50 may be completely disposed (e.g., contained) within an opening 33a of the structural member 30. For example, the width of the lock member 50 may be the same as or less than the width of the side wall 33.

The tongue member 18 may optionally include a second lock member 50 that is configured to further help maintain the lock bar 40 in the second position. For example, the tongue member 18 having a lock bar 40 with a shoulder 42 provided on each end of the body 41 to engage one of two opposing openings 33a in the structural member 30 may include a first lock member 50 configured to secure one shoulder 42 of the lock bar 40 and a second lock member 50 configured to secure the other shoulder 42, such as when the lock bar 40 is in the second position. Thus, both shoulders 42 may be configured to be secured by separate lock members 50. Accordingly, a portion of the first lock member 50 may be disposed within one of the two openings 33a and a portion of the second lock member 50 may be disposed within the other of the two openings 33a. According to an exemplary embodiment, the first lock member 50 may be completely contained within one opening 33a, and the second lock member 50 may be completely contained within the other opening 33a.

The lock member 50 may be configured to generate a biasing force, such as when the legs 51 are separated when the lock bar 40 is configured in its first position and the legs 51 are straddling the shoulder 42 of the lock bar 40, as shown in FIGS. 3 and 6. When the lock bar 40 moves from the first position to the second position, as shown in FIGS. 5 and 7, the legs 51 of the lock member 50 are configured to no longer straddle the shoulder 42 of the lock bar 40, since the shoulder(s) 42 are moved to a position beyond ends of the legs 51, where the biasing force moves the ends of the legs 51 toward one another. In other words, when in the second position, the lock bar 40 is positioned beyond the ends of the legs 51 of the lock member 50, such that the legs 51 are no longer prevented from moving together by the shoulder(s) 42 of the lock bar 40. Accordingly, the ends of the legs 51 move together to a closed position when the lock bar 40 is not separating the legs 51 (e.g., when the lock bar 40 is in the second position). Thus, the lock member 50 may be configured to have its free position as its closed position and its open position as its biasing or loading position. In the closed position, the lock member 50 is configured to prohibit the lock bar 40 from moving from the second position back to the first position. For example, the legs 51 of the lock member 50 may contact a surface of the shoulder 42 and the base 52 of the lock member 50 may contact the structural member 30, such as an inner surface of a side wall 33 that defines an opening 33a (such that the lock member 50 is supported by the structural member 30 when disposed in the opening 33a of the wall 33). Thus, the lock member 50 and structural member 30 may cooperatively prohibit the lock bar 40 from moving from the second position to the first position by counteracting a force trying to move the lock bar 40 from the second position to the first position. It should be noted that the lock member 50 may be configured differently than disclosed herein, and the examples disclosed herein are not limiting. For example, the lock member 50 may be located on one or more side of the lock bar 40, as well as above or below the lock bar 40, and may be connected to or supported by a portion of the structural member 30 and/or the casing 70.

The tongue member 18 may also include a clutch member 60 (e.g., a clamping member). As shown in FIG. 5, the clutch member 60 is configured to help secure a section (e.g., a portion) of the seat belt 12 disposed between the clutch member 60 and the lock bar 40, when the lock bar 40 is positioned in the second position (e.g., locking position). In other words, the clutch member 60 is disposed on the opposing side of the lock bar 40 relative to the section of the seat belt 12 being secured or clamped, such that when the lock bar 40 moves to the second position, the clamping surface 43 of the lock bar 40 clamps the section of the seat belt 12 to the clutch member 60, such as to its clamping surface 63.

The clutch member 60 includes a body 61 that may be coupled to the structural member 30, such as at ends thereof and/or to the walls 33. The body 61 may also include a clamping surface 63 that is configured to engage the seat belt 12, such as when the lock bar 40 is in the second position, where the clamping surfaces 43, 63 may clamp and secure the seat belt 12. The clamping surface 63 of the clutch member 60 may contact a section of the seat belt 12 to clamp the section against another portion of the tongue member 18 (e.g., the clamping surface 43 of the lock bar 40) to secure (e.g., bind, hold) the seat belt 12 in place relative to the tongue member 18. In other words, the clutch member, if provided, and the lock bar may be configured to engage opposing sides of the section of the seat belt 12, such as through opposing clamping surfaces, to secure the section and fix a relative position of the tongue member 18 along the seat belt 12.

The clamping surface 63 may include a friction element or another element configured to help prohibit movement of the seat belt 12 relative to the tongue member 18 when secured. According to an exemplary embodiment, the clamping surface 63 may include teeth formed by a combination of recesses and projections that engage the seat belt 12. According to another exemplary embodiment, the clamping surface 63 includes a tooth configured to engage the seat belt 12. The tooth or teeth of the clamping surface 63 may be configured to mate with the tooth or teeth on the clamping surface 43 of a lock bar 40 to secure the seat belt 12 between the lock bar 40 and the clutch member 60. Accordingly, the teeth of the clamping surfaces 43, 63 may be configured to complement one another.

The clutch member 60 may optionally include a guide 62 configured to help guide the seat belt 12, such as when the tongue member 18 moves along the length of the seat belt 12. As shown in FIG. 5, the clutch member 60 includes an upper guide 62a and a lower guide 62b. For example, the upper guide 62a may be disposed on a first side of the clamping surface 63 and the lower guide 62b may be disposed on a second (e.g., opposite) side of the clamping surface 63. As shown, the upper guide 62a includes a surface that is configured to be contacted by the seat belt 12. The surface of the upper guide 62a may be arcuate or curved to allow the seat belt 12 to wrap around the surface and extend in a direction that is generally perpendicular to the section of the seat belt 12 adjacent to the clamping surface 63. For example, the surface of the upper guide 62a may have a convex shape. As shown, the lower guide 62b includes a surface that is configured to be contacted by the seat belt 12. The surface of the lower guide 62b may be arcuate or curved to guide the seat belt 12 away from the clamping surface 63 and the clutch member 60. For example, the surface of the lower guide 62b may have a concave shape.

The clutch member 60 may be coupled to the structural member 30. According to an exemplary embodiment, the clutch member 60 is pivotally coupled to the structural member 30 to allow the clutch member 60 to pivot relative to the structural member 30. This arrangement allows, for example, the clamping surface 63 of the clutch member 60 to align with the clamping surface 43 of the lock bar 40 (e.g., to compensate for looseness of mating parts, which may result from tolerances), which may advantageously improve the surface area of the seat belt 12 being secured (e.g., contacted) by the lock bar 40 and/or the clutch member 60. For example, the body 61 of the clutch member 60 may include one or more shoulders (e.g., projections, pivots, extensions, etc.) that are configured to pivotally engage openings provided in one or more walls 33 of the structural member 30. According to an exemplary embodiment, each shoulder of the clutch member 60 may be centrally located. According to another exemplary embodiment, each shoulder of the clutch member 60 may be disposed (e.g., provided) on a distal end 64 of the clutch member 60, which may advantageously allow the clamping surface 63 to pivot a greater distance relative to a centrally located pivot.

According to another exemplary embodiment, the clutch member 60 is fixedly coupled to the structural member 30, such that the clutch member 60 is not configured to move relative to the structural member 30. For example, the fixed clutch member 60 may be integrally formed with the structural member 30. Also, for example, the clutch member 60 may be formed separately, then fixedly coupled to the structural member 30.

The tongue member 18 may optionally include a cover or casing 70 that is configured to surround or house a portion of the tongue member 18. For example, the casing 70 may warp around the base 31 and walls 33 of the structural member 30 to house any number of the components of the tongue member 18. The casing 70 may protect the components, such as the lock member 50, housed within the casing 70 and/or may improve the aesthetics of the tongue member 18.

The tongue member 18 may be assembled using a three step method or process. In the first step, the lock bar 40 may be coupled to the structural member 30 by skewing (e.g., tilting) the lock bar 40 relative to the spacing between the walls 33 to fit each shoulder 42 of the lock bar 40 in the respective opening 33a of the wall 33. Once both shoulders 42 are in their respective openings 33a, the lock bar 40 may be realigned to be in the first position relative to the structural member 30.

In the second step, the clutch member 60, if provided and not integrally formed with the structural member 30, may be coupled to the structural member 30. The tongue member 18 may advantageously be configured such that when the clutch member 60 is coupled to the structural member 30, the lock bar 40 is retained to the structural member 30, because the clutch member 60 may prohibit the lock bar 40 from being able to move to a position where the shoulders 42 are able to disengage from the openings 33a of the walls 33. For example, the lock bar 40 may have a length (e.g., between the ends of the shoulders 42) that is tailored to allow the shoulders 42 of the lock bar 40 to engage the openings 33a of the walls 33 when the lock bar 40 is aligned at an angle relative to the first position of the lock bar 40. Thus, the length does not allow the lock bar 40 to be engaged or disengaged from the structural member 30 unless lined at the angle. The length of each opening 33a may be tailored to allow the lock bar 40 to be aligned at the angle when the clutch member 60 is not coupled to the structural member 30, but does not allow the lock bar 40 to be aligned at the angle when the clutch member 60 is coupled to the structural member 30. In other words, the lengths of the lock bar 40 and openings 33a may be tailored to allow the lock bar 40 to be rotated to at least the angle without the clutch member 60, but only to be rotated less than the angle with the clutch member 60. Accordingly, once the clutch member 60 coupled to the structural member 30, the lock bar 40 cannot be disengaged from the structural member 30.

In the third step, the lock member(s) 50 may be installed. The lock bar 40 may be moved to the second position, where the lock member 50 may be installed into the opening 33a of the wall 33. Then, the legs 51 of the lock member 50 may be splayed open, such as by a tool or by hand, whereby the lock bar 40 is moved to the first position. The method of assembling the tongue member 18 may further include a fourth step of attaching the casing 70 to the structural member 30, if a casing is provided.

The tongue member 18 is configured to operate in one of two modes, a first non-locking mode of operation and a second locking mode of operation. In the non-locking mode of operation, the tongue member 18 may move freely (e.g., slide) along the seat belt 12, such as along the length of the seat belt 12 to provide comfort adjustment of the seat belt assembly 10 for the secured occupant. In the locking mode of operation, the tongue member 18 clamps a portion or a section of the seat belt 12 to the tongue member 18, such that the tongue member 18 maintains a relative position along the length of the seat belt 12. In other words, in the locking mode of operation, the tongue member 18 fixes its relative position along the seat belt 12 to prevent relative movement therebetween.

FIGS. 2, 3, and 6 illustrate the tongue member 18 in the non-locking mode of operation. In the non-locking mode of operation, the lock bar 40 is in a forward position (e.g., relative to the latch plate 32) in the opening 33a of the structural member 30 such that there is a gap between the clamping surface 43 of the lock bar 40 and the surface opposing the clamping surface 43 (e.g., the clamping surface 63 of the clutch member 60) that is large enough to allow the seat belt 12 and the tongue member 18 to move freely relative to one another. In other words, when the lock bar 40 is in the first position, the tongue member 18 is in the non-locking mode of operation.

As shown in FIG. 5, the seat belt 12 is configured to wrap around the lock bar 40, such as around at least a portion of the body 41 of the lock bar 40. During a dynamic vehicle event, such as a rollover or frontal impact, the secured occupant is restrained from forward movement by the seat belt 12 of the seat belt assembly 10. Upon restraining of the occupant, the occupant loads the seat belt 12, which in turn induces tension into the seat belt 12 and causes the lock bar 40 to move from the first position to the second position. In other words, the tongue member 18 is configured so that loading of the seat belt 12 by the secured occupant induces the tongue member 18 to change from the non-locking mode to the locking mode of operation. It is noted that the amount (e.g. length) of travel of the lock bar 40 may be configured to be driven by the level of loading on the seat belt 12 (e.g., the lap portion 14, the shoulder portion 16), which may advantageously allow for the seat belt assembly 10 to be configured to be adjustable to specific load conditions.

FIGS. 4, 5, and 7 illustrate the tongue member 18 in the locking mode of operation. In the locking mode of operation, the lock bar 40 is in a rearward position in the opening 33a of the structural member 30 (e.g., relative to the latch plate 32), where the clamping surface 43 of the lock bar 40 and the surface opposing the clamping surface 43 (e.g., the clamping surface 63 of the clutch member 60) are brought together to clamp (e.g., pinch, secure, etc.) a portion of the seat belt 12 disposed between the clamping surfaces. In other words, when the lock bar 40 is in the second position, the tongue member 18 is in the locking mode of operation. Once the lock bar 40 is in the second position, the lock member 50 prohibits the lock bar 40 from moving from the second position to ensure the tongue member 18 maintains its locking mode of operation throughout the entire vehicle dynamic event.

Thus, the tongue member 18 is configured to lock (e.g., secure) a section (e.g., lap portion) of the seat belt during the entire vehicle dynamic event, such as during an entire rollover event. This may advantageously reduce the likelihood of occupant injury by restraining the occupant throughout the vehicle event, which may particularly decrease the likelihood of head and neck injuries of the occupant.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seatbelt systems, tongue members, and latch plates as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A tongue member for use in a seat belt system also including a buckle mechanism and a seat belt, the tongue member comprising:
    a structural member including a latch plate configured to detachably engage the buckle mechanism and a side wall including an opening;
    a lock bar configured to move along the opening between a first position and a second position relative to the structural member; and
    a lock member configured to secure the lock bar in the second position;
    wherein when the lock bar is in the first position, the tongue member is allowed to move freely along the seat belt, and
    wherein when the lock bar is in the second position, a clamping surface of the lock bar secures a section of the seat belt to a clamping surface of the structural member to fix a relative position of the tongue member along the seat belt.

2. The tongue member of claim 1, wherein the lock member is moveable between an unlocked position and a locked position, wherein when in the unlocked position the lock bar is free to move, and wherein the lock member is configured to move to the locked position when the lock bar moves to the second position to secure the lock bar in the second position.

3. The tongue member of claim 2, wherein at least a portion of the lock member is disposed in the opening of the side wall.

4. The tongue member of claim 3, wherein when the lock bar is in the first position, a shoulder of the lock bar is provided between two legs of the lock member, and wherein when the lock bar is in the second position, the shoulder is held in place by the legs.

5. The tongue member of claim 4, wherein the lock member a spring, and each leg is biased toward each other, such that when the lock bar is the second position, the legs move toward one another and each leg has an end that engages the shoulder of the lock bar.

6. The tongue member of claim 5, wherein an outer surface of the lock member complements an inner surface of the opening when the lock member is in the unlocked position.

7. The tongue member of claim 1, wherein the clamping surface of the lock bar includes a friction element that engages the section of the seat belt when the lock bar is in the second position.

8. The tongue member of claim 7, wherein the friction element includes teeth.

9. The tongue member of claim 8, wherein the clamping surface of the structural member includes teeth that complement the teeth of the lock bar.

10. A seat belt system for securing an occupant of a vehicle, the seat belt system comprising:
    a seat belt;
    a buckle mechanism; and
    a tongue member slideably coupled to the seat belt, the tongue member comprising:
    a structural member including a latch plate configured to detachably engage the buckle mechanism;
    a lock bar movably attached to the structural member and configured to move between a first position and a second position; and
    a lock member configured to secure the lock bar in the second position;
    wherein when the lock bar is in the first position, the tongue member can slide freely along the seat belt, and wherein when the lock bar is in the second position, a clamping surface of the lock bar secures a section of the seat belt to a clamping surface of the structural member to fix a relative position of the tongue member along the seat belt.

11. The seat belt system of claim 10, wherein the structural member also includes two opposing openings, and wherein the lock bar includes a shoulder at each of two opposite ends, such that each shoulder engages one opening to movably attach the lock bar to the structural member.

12. The seat belt system of claim 11, wherein at least a portion of the lock member is disposed within one of the two openings and is configured to engage one shoulder of the lock bar to secure the lock bar in the second position.

13. The seat belt system of claim 12, further comprising a second lock member, wherein at least a portion of the second lock member is disposed within the other of the two openings and is configured to engage the other of the two shoulders of the lock bar to secure the lock bar in the second position.

14. The seat belt system of claim 13, wherein the lock member is completely contained within the one opening, and the second lock member is completely contained within the other opening.

15. The seat belt system of claim 11, wherein the lock member is completely contained within one of the two openings.

16. A tongue member for use in a seat belt system of a vehicle, the seat belt system also including a buckle mechanism and a seat belt, the tongue member comprising:
   a structural member including a latch plate configured to detachably engage the buckle mechanism;
   a clutch member including a clamping surface and coupled to the structural member; and
   a lock bar including a clamping surface and slideably coupled to the structural member such that the lock bar can slide between a first position and a second position relative to the clutch member;
   wherein when the lock bar is in the first position, the tongue member is allowed to move freely along the seat belt,
   wherein when the lock bar is in the second position, the clamping surfaces of the clutch member and lock bar engage opposing sides of a section of the seat belt to secure the section and fix a relative position of the tongue member along the seat belt,
   wherein each clamping surface includes a friction element;
   wherein the friction element of the lock bar includes teeth;
   wherein the friction element of the clutch member includes teeth that complement the teeth of the lock bar; and
   wherein the clutch member is pivotally coupled to the structural member by a pivot that allows for a rotation of the clutch member relative to the structural member.

17. The tongue member of claim 16, wherein the pivot is located on a distal end of clutch member.

18. The tongue member of claim 16, further comprising a lock member configured to secure the lock bar in the second position, wherein the lock member has an unlocked position wherein the lock bar is free to slide relative to the structural member, and wherein when the lock bar slides to the second position, the lock member moves to a locked position wherein the lock member secures the lock bar in the second position.

* * * * *

UNITED STATES PATENT AND TRADEMARK OFFICE
CERTIFICATE OF CORRECTION

PATENT NO. : 8,840,145 B2  
APPLICATION NO. : 13/922118  
DATED : September 23, 2014  
INVENTOR(S) : Jonathan Michael Boughner et al.

Page 1 of 1

It is certified that error appears in the above-identified patent and that said Letters Patent is hereby corrected as shown below:

Title Page, Item (72), the first inventor's name should read as:

--JONATHAN MICHAEL BOUGHNER--

Signed and Sealed this  
Twenty-fourth Day of March, 2015

Michelle K. Lee  
*Director of the United States Patent and Trademark Office*

UNITED STATES PATENT AND TRADEMARK OFFICE
CERTIFICATE OF CORRECTION

| | |
|---|---|
| PATENT NO. | : 8,840,145 B2 |
| APPLICATION NO. | : 13/922118 |
| DATED | : September 23, 2014 |
| INVENTOR(S) | : Boughner et al. |

It is certified that error appears in the above-identified patent and that said Letters Patent is hereby corrected as shown below:

<u>Title Page,</u>
Item [75], Inventors, "Jonathan Michael Boughner" (as corrected to read in the Certificate of Correction issued March 24, 2015) is deleted and patent is returned to its original state with inventors name in patent to read -- Jonathon Michael Boughner --.

Signed and Sealed this
Twenty-first Day of April, 2015

Michelle K. Lee
*Director of the United States Patent and Trademark Office*